United States Patent
Maier et al.

(10) Patent No.: US 11,185,049 B2
(45) Date of Patent: Nov. 30, 2021

(54) TEAT CUP SHELL AND MODULAR TEAT CUP SHELL SYSTEM

(71) Applicants: Jakob Maier, Turkheim (DE); Wilfried Hatzack, Turkheim (DE)

(72) Inventors: Jakob Maier, Turkheim (DE); Wilfried Hatzack, Turkheim (DE)

( * ) Notice: Subject to any disclaimer, the term of this patent is extended or adjusted under 35 U.S.C. 154(b) by 235 days.

(21) Appl. No.: 16/326,264

(22) PCT Filed: Jul. 20, 2017

(86) PCT No.: PCT/EP2017/068325
§ 371 (c)(1),
(2) Date: Feb. 18, 2019

(87) PCT Pub. No.: WO2018/033338
PCT Pub. Date: Feb. 22, 2018

(65) Prior Publication Data
US 2019/0183086 A1 Jun. 20, 2019

(30) Foreign Application Priority Data
Aug. 19, 2016 (DE) .......................... 102016215633.0

(51) Int. Cl.
*A01J 5/08* (2006.01)

(52) U.S. Cl.
CPC ...................... *A01J 5/08* (2013.01)

(58) Field of Classification Search
CPC ........ A01J 5/08; A01J 5/06; A01J 5/04; A01J 5/00; A01J 5/044
See application file for complete search history.

(56) References Cited

U.S. PATENT DOCUMENTS

| | | | | | |
|---|---|---|---|---|---|
| 4,269,143 | A | * | 5/1981 | Erbach | A01J 5/08 119/14.49 |
| 4,303,038 | A | * | 12/1981 | Thompson | A01J 5/08 119/14.36 |
| 6,202,593 | B1 | * | 3/2001 | Maier | A01J 5/08 119/14.47 |
| 6,308,656 | B1 | | 10/2001 | Milbrath et al. | 119/14.47 |

(Continued)

FOREIGN PATENT DOCUMENTS

| | | | | |
|---|---|---|---|---|
| DE | 102007061853 | | 12/2009 | |
| DE | 19949151 A1 | * | 4/2021 | A01J 5/08 |

(Continued)

OTHER PUBLICATIONS

English translation of German Search Report dated May 9, 2017 in corresponding German application 10 2016 215 633.0, 3 pages.

(Continued)

*Primary Examiner* — Timothy D Collins
*Assistant Examiner* — Madeline L Douglas
(74) *Attorney, Agent, or Firm* — Fattibene and Fattibene LLC; Paul A. Fattibene

(57) ABSTRACT

A teat cup sleeve constructed from two connectable sleeve parts, a modular teat cup system and a corresponding method for the application of a modular teat cup sleeve are provided. The modular design of the teat cup sleeve allows a versatile adaptation of one teat cup to different milking conditions, for example by changing one sleeve part while retaining the other sleeve part with the necessary connection arrangement.

15 Claims, 2 Drawing Sheets

(56) References Cited

U.S. PATENT DOCUMENTS

| | | | | |
|---|---|---|---|---|
| 6,427,625 B1* | 8/2002 | Schuster | ............... | A01J 5/0175 |
| | | | | 119/14.47 |
| 6,857,389 B2* | 2/2005 | Miller | ....................... | A01J 5/08 |
| | | | | 119/14.49 |
| 2004/0035367 A1* | 2/2004 | Maier, Jr. | ................... | A01J 5/08 |
| | | | | 119/14.07 |
| 2007/0157887 A1 | 7/2007 | Fernandez | ................. | 119/14.49 |
| 2008/0202433 A1 | 8/2008 | Duke | ......................... | 119/14.49 |
| 2008/0276871 A1* | 11/2008 | Auburger | ................... | A01J 5/08 |
| | | | | 119/14.49 |
| 2015/0289470 A1* | 10/2015 | Bahlenberg | ............. | A01J 5/007 |
| | | | | 119/14.08 |

FOREIGN PATENT DOCUMENTS

| | | |
|---|---|---|
| EP | 0566977 | 10/1993 |
| EP | 1239726 | 9/2002 |
| EP | 1806050 | 7/2007 |
| WO | WO 2007/031783 | 3/2007 |
| WO | WO 208073820 | 4/2008 |

OTHER PUBLICATIONS

International Search Report for corresponding International Application No. PCT/EP207/068325, dated Oct. 25, 2017; 3 pages.
German Search Report dated May 9, 2017 in corresponding German application 10 2016 215 633.0, 5 pages.

* cited by examiner

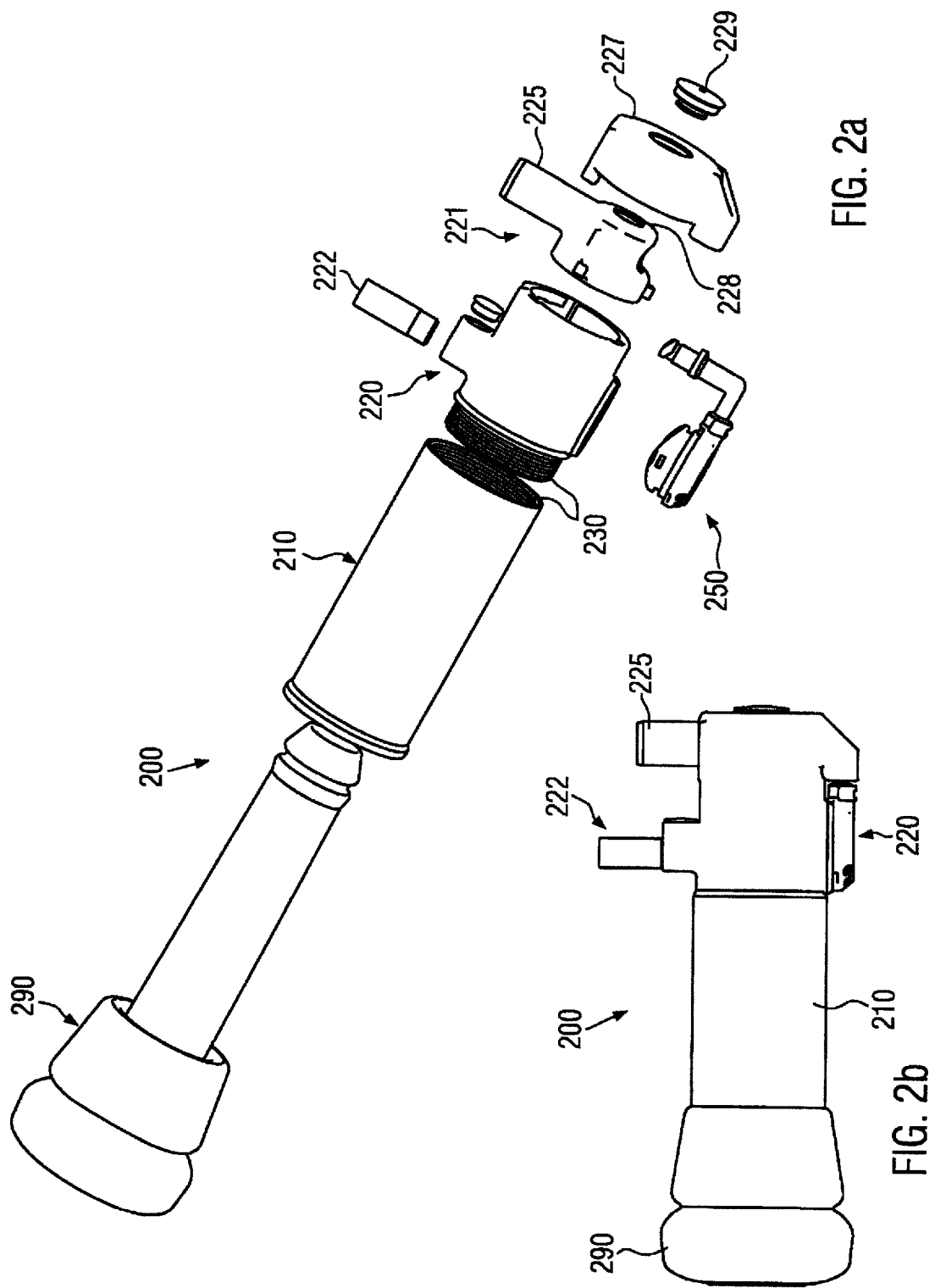

TEAT CUP SHELL AND MODULAR TEAT CUP SHELL SYSTEM

FIELD OF THE INVENTION

The present invention in general refers to the field of milking technology and in particular teat cups used for milk withdrawal.

BACKGROUND OF THE INVENTION

When milking dairy animals, if a certain degree of automation is used, a teat cup consisting of a teat cup sleeve, typically made of metal, and an elastic teat holder, also known as a teat rubber, is attached to a teat of the animal to be milked and then, depending on the milking technique used, the milk is extracted with a more or less high vacuum, usually by rhythmically folding the elastic teat holder.

The teat cup sleeve is provided with appropriate connections for attaching a milk hose and, if necessary, a hose for connection to a pulsator. As a rule, the teat cup sleeve is manufactured as a tubular element with a certain diameter and a certain length adapted to the conditions of use. Furthermore, the teat cup sleeve must also have a certain mechanical stability, so that any impact during the milking process and in particular any step load by the animal to be milked takes place without damaging the teat cup sleeve and the elastic teat holder. Although the available teat cup sleeves are generally technically mature and are typically manufactured with a high degree of precision, the flexibility in handling the teat cup sleeves is very limited. For example, when changing the elastic teat holder, a certain amount of time is required to remove the used teat holder from above and insert the new teat holder so that correct positioning is ensured within the teat cup sleeve and at its upper edge.

Furthermore, the teat cup sleeves in conjunction with the respective elastic teat holders are designed according to animal-specific conditions, so that the use of a teat cup sleeve for one animal species in conjunction with another animal species is usually hardly possible. Even when using very differently designed elastic teat cups, it may be necessary to use a different, compatible teat cup sleeve in order to achieve correct milking behavior. In particular, the different teat lengths of the animals in a herd, but also for different animal species, is a reason that requires the exchange of the teat cup sleeve.

SUMMARY OF THE INVENTION

It is therefore a object of the present invention to provide means which increase the flexibility for the use and adaptation of a teat cup shell to different milking conditions.

According to an aspect of the present invention, a teat cup shell is provided to solve the above object. The teat cup sleeve according to the invention comprises a first sleeve part which is suitable for inserting an elastic teat holder and a second sleeve part which can be coupled to the first sleeve part to achieve operational readiness and can be uncoupled from the first sleeve part.

Due to this modular design of the teat cup sleeve, it is generally possible to select the properties, such as dimensions, material type or types, shape, etc., in different ways for the two sleeve parts without unnecessarily complicating the entire manufacturing process, as both sleeve parts can be manufactured independently of each other. The ability of the two sleeve parts to be coupled also allows rapid adaptation to other animal species and/or milking conditions, with only one of the two sleeve parts, such as the first sleeve part, having to be replaced if necessary. For example, if a different type of animal is milked, e.g. where the size of the teats differs significantly from a previously milked species, an adaptation to the new type of animal to be milked can be made, for example, by selecting a suitable first sleeve part, whereas, for example, the second sleeve part remains the same and allows a connection to the rest of the milking system without further changes. There is also a considerable advantage when replacing the elastic teat holder, as the modular design means that the process of removing the used teat holder and introducing the new teat holder is much less time-consuming and the position of the teat holder, for example with regard to a correct turning position, can be adjusted and checked without great effort. Once the teat holder has been inserted into at least the first sleeve part, the second sleeve part can therefore be connected without great effort.

In another version, the second sleeve part has a connection for a milk hose and/or an opening for an outlet end of the elastic teat holder. This means that in this version there is at least the connection arrangement required for connection to the milk-carrying part of the rest of the milking system, for example in the form of a connection or in the form of an opening in which a connection line for the teat holder can be made. This is particularly advantageous, as explained above, if a different type of teat holder is to be used and the connection conditions to the milk discharge system remain relatively unchanged. Even when replacing a teat cup with a milk hose attached to it, the introduction of the teat cup holder is particularly easy in this case due to the modular design of the teat cup sleeve according to the invention.

In another version, the connection for a milk hose is detachably attached to the second sleeve part. In this variant, there is an additional degree of increased flexibility when using the teat cup sleeve, as at least the connection for the milk hose is also provided in such a way that it can be removed from the second sleeve part and reconnected if necessary. This is particularly advantageous if, for example, the second sleeve part has to be replaced due to operational conditions, but otherwise the connection conditions for the milk line system have to be maintained.

In another embodiment, the first or second sleeve part has a connection for a pulsation line. As already explained above, many milking techniques require a rhythmic interruption of the milk flow from the teat to be milked, which is usually achieved by a controlled folding of the elastic teat holder. For this purpose, the pulsation line, for example, creates a first pressure in the teat cup between the teat cup sleeve and the elastic teat holder, which leads to the milk flow from the teat being as unhindered as possible. In another operating phase, which essentially leads to an interruption of the milk flow and thus also to a massaging movement at the teat, a second, higher pressure is generated. This second pressure is typically achieved by atmospheric pressure or at least a pressure which is significantly higher than the pressure in the first operating phase, so that the desired folding of the elastic teat holder is made possible. By providing a corresponding connection to the first sleeve part or the second sleeve part, a high degree of flexibility in the connection of the corresponding hose lines to the teat cup sleeve is achieved by combining a first sleeve part without connection of a pulsation line with a second sleeve part with connection, or vice versa a first sleeve part with a connection for the pulsation line can be combined with a second sleeve part without connection in order to take into account different operating conditions or different conditions for the handling of the teat cup sleeve.

In another advantageous embodiment, a coupling device is provided which allows mechanical coupling and decoupling of the first and second sleeve parts independently of the construction of a substantial part of the first and second sleeve parts. In this embodiment, the coupling device is designed in such a way that sleeve parts of different designs, i.e. with different dimensions, materials, shapes and the like, can be connected to each other and decoupled from each other. The expression that the coupling and decoupling takes place independently of the structure of a substantial part of the first and second sleeve parts is to be understood in such a way that a predetermined mutually compatible structure is provided in the region of the coupling device for both sleeve parts, so that the first and the second sleeve part can be coupled to one another and decoupled from one another, but the remainder of the respective parts can be constructed in almost any and thus independent manner in order to take account of the various different conditions. For example, the coupling device is designed as an area of the first sleeve part and the second sleeve part each provided with a thread, so that coupling and decoupling of the two sleeve parts can take place by a screw joint. In other variants, corresponding connecting elements, such as clamps, screws and the like, may be provided which are to be attached to certain areas of the first and second sleeve parts and thus constitute components of the coupling device in order to be able to connect the sleeve parts with each other, without, however, subjecting the construction of the essential part of the respective sleeve parts to further restriction.

In an advantageous embodiment, the coupling device is designed in such a way that coupling and decoupling of the first and second sleeve parts is possible without tools. In this variant, a high degree of operating comfort is achieved, since decoupling of the sleeve parts is possible at any time, and thus, for example, a possibly necessary adaptation to changed milking conditions is possible by exchanging the first and/or the second sleeve part. Especially for all additional maintenance work and other tasks, such as the replacement of the elastic teat holder, a thorough cleaning of the teat cups, an inspection of the pulse chamber, etc., the possibility of coupling without tools is a decisive advantage, since the financial and time expenditure associated with the actions to be performed is low compared to conventional teat cups. In addition, possible inspection and maintenance work in conventional teat cups is often omitted, since a particularly high effort is required, for example, to inspect the inside of the teat cup sleeve, in particular the space between the elastic teat holder and the teat cup sleeve, i.e. the pulse chamber or pulsation chamber, and to clean it if necessary.

In another advantageous embodiment, sealing means are provided at a contact area between the first sleeve part and the second sleeve part. These sealing means ensure that when the two sleeve parts are coupled, essentially the same functionality is achieved as with a conventional non-modular teat cup sleeve, so that in particular the required pressure conditions can be produced inside the teat cup sleeve when the first and second sleeve parts are coupled.

In another embodiment, a protective element, such as a protective ring, is attached to or can be coupled to the first sleeve part to provide a suitable surface to which the elastic teat holder can rest, for example.

A ballast element is provided in a preferred embodiment, which can be attached to the first and/or second sleeve part to adjust the weight of the teat cup sleeve. In this way, a desired total weight can be set to obtain the desired milking conditions regardless of the type of material used to manufacture the first and/or second sleeve part. For example, both sleeve parts or one sleeve part can be made of a resistant but relatively light material, such as plastic material, but this does not affect the behavior during milking when a relatively high weight of teat cups is desired, for example to obtain a certain stimulating effect, a certain position of the teat cups during milking, and the like. By providing the ballast element, a desired weight and thus behavior during milking can be adjusted in almost any way by selecting the appropriate ballast element or one or more ballast elements to achieve the required mechanical behavior of the teat cup shell. It is advantageous that the ballast element can be detachably attached to the first and/or second sleeve part so that a quick replacement of the ballast element is possible. For this purpose, the ballast element is designed as a tubular component in illustrative embodiments, which can be pushed over the first sleeve part and/or the second sleeve part, for example, and can be coupled or locked to this sleeve part. The ballast element may also be designed to serve as a reinforcing element to give higher strength to the first and/or second sleeve part, which may otherwise be made of a material that allows low manufacturing costs and/or efficient manufacturing processes and/or small amounts of material, etc.

In another embodiment, an opening is provided for an air inlet at the first or second sleeve part. Through this opening, air can be introduced continuously or periodically so that the discharge of the milk is enhanced and more favorable pressure conditions are created under the teat. In advantageous embodiments, the opening is suitable for receiving an air inlet valve, which allows a controlled air inlet in order to introduce air into the milk discharge area in a targeted and time-limited manner. This air inlet, controlled by the valve, has the characteristic of creating favorable pressure conditions when the milk is discharged, but no more air is admitted afterwards, so that the total amount of air admitted is no greater or even smaller compared to a continuous inlet, but a more distinct pressure difference is nevertheless created when the milk is discharged. A corresponding opening is particularly advantageous for teat cup sleeves which are operated in conjunction with a Bio-Milker® valve in which an air inlet is periodically made in the milk discharge area of the teat cup sleeve to allow more efficient and animal-friendly milking. The advantage here is that this opening and thus the valve insert can be provided depending on the conditions at the first or second sleeve part, so that a high degree of flexibility is also possible here when adapting the teat cup sleeve to the corresponding animal species and/or the prevailing milking conditions. The possibility of providing different designs for a sleeve part with regard to the air inlet, i.e. a sleeve part designed for a continuous air inlet, a sleeve part designed for a periodic air inlet by means of a valve, or a sleeve part which does not permit an air inlet, results again in a high degree of flexibility for adapting the teat cup to different conditions of the milking system or for setting different milking characteristics. Alternatively, in some embodiments, suitable inserts are provided for the first and/or second sleeve part.

In another advantageous embodiment, a lockable maintenance opening is provided in the second sleeve part. The maintenance work, which for example enables a quick inspection of the inner chamber and, if necessary, the removal of foreign matter from the teat cup sleeve, is carried out at a suitable location, which allows access to a part of the flow channel for the milk, so that inspection and/or removal of foreign matter can be carried out there without great expenditure of time and tools. The lockable opening may, for example, be used in conjunction with a plug which, on the one hand, ensures a tight and reliable closure of the maintenance opening and, on the other hand, is advantageously removable without tools so that inspection and, if necessary, intervention can be carried out on the spot. The maintenance opening is particularly advantageous in situations where the teat cup frequently comes into contact with the ground, especially when no measures have been taken to switch off the operating vacuum at the teat cup involved in such situations, as in this case foreign matters are preferably sucked in.

According to another aspect of the present invention, the above-mentioned object is solved by a modular teat cup system. The teat cup system comprises at least one teat cup sleeve with a first sleeve part and a second sleeve part, whereby several first sleeve parts and/or several second sleeve parts belong to the teat cup system in advantageous embodiments. As described above, the modular design of the teat cup sleeve in the system enables the first sleeve part and the second sleeve part to be coupled and decoupled quickly and efficiently so that many different or even identical variants of a teat cup sleeve can be created.

Advantageously, at least the first sleeve part with different designs is available for adaptation to different elastic teat holders and/or different milking conditions. This means that in the system the first sleeve part is preferably available in different variants, e.g. with different dimensions, made of different materials, generally with different shapes and the like, so that a multitude of teat cup variants can be produced. As explained above, it may often be necessary to take animal specific characteristics into account, for example by selecting a suitable teat cup receptacle, for example in terms of diameter and/or length, and the like, which in turn requires adaptation of the teat cup sleeve, which can be achieved by providing a suitable first teat cup part, for example. For example, for milking small dairy animals, such as goats, sheep, etc., a certain range of teat cup sizes is usually desired, but clearly different from teat cup sizes for larger dairy animals, such as cows. As a rule, it is therefore not possible to use existing teat cups, such as those used for goats, for larger dairy animals. However, in the teat cup system according to the invention, an essential part of the teat cup sleeve can be retained, such as the second sleeve part, while the first sleeve part is adapted to the desired milking conditions so that, for example, a suitably sized first sleeve part is combined with an existing second sleeve part. In other cases, it may be desirable to generally use a different type of material or combination of materials for the first sleeve part to take into account certain conditions such as total weight, handling of the teat cup, and the like. It is especially advantageous when the first sleeve part is available with different lengths so that different lengths of the elastic teat holder can be responded to.

In another advantageous embodiment, the second sleeve part is provided with different connection arrangements for connection to a milk line system and/or a pulsator. Often the situation occurs that a milking gear and thus the teat cups are suitable in principle for the milking process of a special animal species and the local conditions, but for example the milk transport requires a connection in a certain direction, for example angled, straight-line, and the like, in order to enable optimal milking. In this case, only the second sleeve part with a suitable connection configuration is selected and coupled to the existing first sleeve part instead of an existing second sleeve part in order to meet the new requirements. This can be advantageous if, for example, the distance between teat tip and ground during milking is generally changed due to measures taken, so that, for example, a straight connection piece is unsuitable for connection to a milk line, and an angled connection geometry is required.

It is also advantageous, as mentioned above, that the first and/or the second sleeve part are available in embodiments with different materials in the teat cup system.

In other advantageous variants, the connection or connection arrangement for connection to a milk line and/or pulsation line is modular and can therefore be coupled to the second sleeve part independently of other characteristics of the teat cup sleeve.

According to a further aspect of the present invention, the aforementioned object is solved by a method for adapting a teat cup sleeve. In this method, a first sleeve part and a second sleeve part are selected in such a way that they are suitable for accommodating a desired elastic teat holder. In other words, suitable candidates for the first sleeve part and suitable candidates for the second sleeve part are determined that meet the requirements with regard to teat accommodation. In a further step, the first sleeve part and the second sleeve part are selected so that they are also suitable for connection to a milking system. This means that candidates are selected from the identified candidates which also meet the requirements to be connected to the given milking system. Finally, the first sleeve part and the second sleeve part are coupled so that a teat cup sleeve is created that meets the specified conditions. In particular, in the method in a further variant a total weight of the teat cup sleeve can be set by a ballast element and/or a selection of a type of material for the first and/or the second sleeve part. Such a method, combined with the modular design of the teat cup sleeve according to the invention, not only makes it possible to select and create a suitable combination for a teat cup sleeve prior to a milking operation, but also makes it possible to efficiently adjust the total weight and thus the mechanical behavior of the teat cup sleeve, for example, during the milking operation itself, since the characteristics of the teat cup sleeve can be adjusted quickly and easily.

In another variant, the method involves selecting a suitable connection arrangement for a pulsation line by selecting an appropriate first or second sleeve part or by attaching an auxiliary part in different designs. This means that the adaptation to the pulsation system can, if necessary, be carried out independently of other characteristics of the cup sleeve.

In a further variant, the method comprises selecting a suitable connection arrangement for a milk line by selecting a corresponding second sleeve part and/or a modular connection arrangement which can be coupled to the second sleeve part. In this way an adaptation to the milk line can be made without being influenced by other conditions of the milking system. In particular, by selecting a suitable modular connection, it is possible to provide a suitable connection configuration for the milk line connection without affecting the further configuration of the cup sleeve. For example, by selecting a suitable connection, a straight line discharge or an angled connection pointing in a desired direction to the milk line can be provided.

In a further advantageous embodiment, the method further comprises selecting the first and/or second sleeve part such that a periodic air inlet, a continuous air inlet or no air inlet is enabled in the discharge of milk. An adjustment in this respect can also be made independently of the rest of the configuration of the cup sleeve. This means that, thanks to the modular system, it is possible to achieve an adjustment, even iteratively or for a short time during operation, whereby, in addition to the important aspect of adapting the teat holder to the type of animal and/or teat length, an adjustment can be made, if necessary also independently of each other, of other important aspects such as the connection configuration for the pulsation line, the connection configuration of the milk line and the type of air inlet, i.e. periodically, continuously or no air inlet.

Further advantageous embodiments are shown in the dependent patent claims and are also described in more detail in the further description.

BRIEF DESCRIPTION OF THE DRAWINGS

The descriptions of further embodiments are given in connection with the accompanying drawings in which:

FIG. 2a shows a perspective elevation view of a further embodiment of the teat cup sleeve according to the invention, wherein a milk hose connection is provided laterally, i.e. angled to the longitudinal axis of the teat cup sleeve, FIG. 2b shows a side view of a teat cup, i.e. a teat cup sleeve according to the invention in connection with an elastic teat holder.

DETAILED DESCRIPTION OF THE PREFERRED EMBODIMENTS

Figures 1A, 1B:
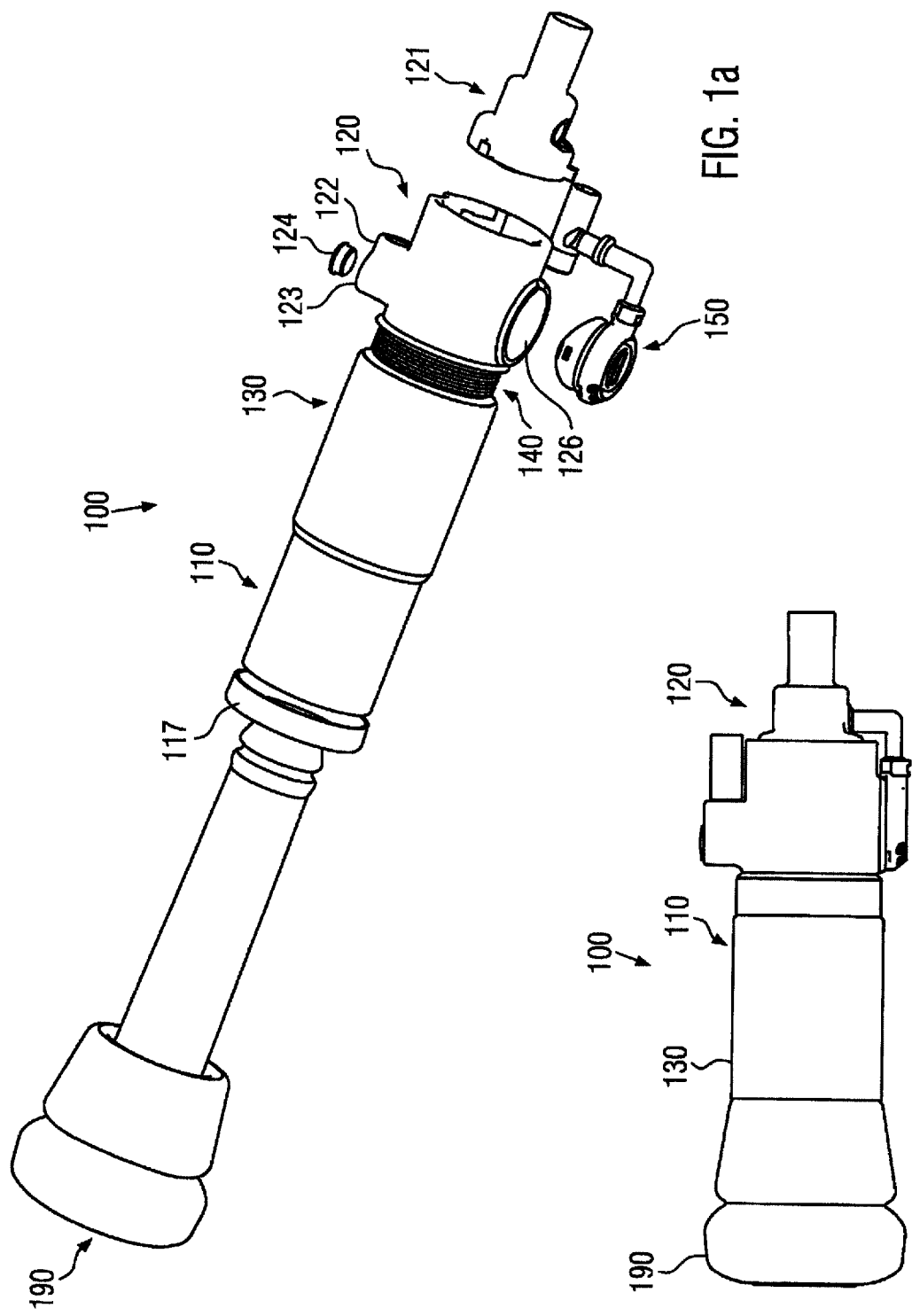
FIG. 1a shows a perspective elevation view of a teat cup sleeve according to the invention of an illustrative design.
FIG. 1b shows a side view of the teat cup sleeve according to the invention, wherein an assembled condition is shown in which an elastic teat holder is contained so that the combination of teat cup sleeve and elastic teat holder forms a teat cup.

FIG. 1a shows a perspective elevation view of a teat cup sleeve 100, which is composed of at least a first sleeve part 110 and a second sleeve part 120. The first sleeve part 110 is formed in the embodiment shown to be suitable for inserting an elastic teat holder 190, also known as teat rubber, the sleeve 110 being designed to have dimensions suitable for receiving the elastic teat holder 190 for correct operation. This means that the sleeve part 110 is designed in particular in diameter and length in such a way that it is adapted to the desired type and size, i.e. diameter and length, of the teat holder 190. A protective ring 117 can be provided in illustrative embodiments, which may be used for edge rounding or for another protective function in order to enable contact between the receptacle 190 and the sleeve part 110 that is as gentle on the material as possible. In other embodiments, the protective ring 117 is also designed as an adaptation element so that, if necessary, it can also be adapted to different shapes and/or dimensions of the elastic teat holder 190 with the same sleeve part 110. With regard to the length of the elastic teat holder 190, it should be noted that a suitable adaptation can be made efficiently by selecting a suitable first sleeve part 110 and/or a suitable second sleeve part 120. If, for example, the teat cup sleeve 100 is part of a teat cup system in which several first sleeve parts 110 are available which have different properties, for example different diameters and/or lengths and/or geometries and/or material compositions and/or different connection variants, and the like, a simple adaptation to the conditions of the elastic teat holder 190 to be used can be achieved.

In the embodiment shown, the second sleeve part 120 is designed to have an opening for the teat holder 190 if it contains an integrated milk hose, or a connection 121 is provided which is brought into contact with the teat holder 190, so that a flow connection is created between the connection 121 with an outlet end of the teat holder 190. In the embodiment shown, the connection direction of connection 121 is essentially in the longitudinal direction of teat cup sleeve 100, so that in this geometry the milk can be discharged particularly efficiently without greater flow resistance.

In a further embodiment, as shown for instance in FIG. 1a, the connection 121, which serves for milk discharge, is provided as a separate component which is designed in such a way that it can be mechanically coupled to and uncoupled from the second sleeve part 120. In this embodiment, the connection 121 therefore represents a third sleeve part which is assigned the same reference numeral 121 and provides a suitable geometry for the connection of a milk line. This means that the third sleeve part in the form of connection 121 is designed in such a way that it can be coupled with the second sleeve part 120 on the one hand, but on the other hand it provides a suitable geometry for discharging the milk and thus for connecting a milk line. In the embodiment shown, this is a connection direction running in the longitudinal direction of the teat cup, while in other variants, such as those shown below in conjunction with FIGS. 2a, 2b, an angled geometry is provided. However, other connection geometries are also possible for a respective connection of the third sleeve part in the form of connection 121, so that an efficient adaptation to given conditions is possible.

Furthermore, in this embodiment a connection 122 is provided which serves for connection to a pulsation line which, as already mentioned at the beginning, creates suitable pressure conditions in a pulsation chamber, i.e. a space which is formed between the outer wall of the teat holder 190 and the wall of the teat cup sleeve 100 as soon as the holder 190 is inserted into the teat cup sleeve 100 and connected there to the connection 121. In the embodiment shown, the connection 122 for a pulsation line may have one or more other input connections, such as an opening 123 which can be closed with a plug 124 to provide a greater degree of flexibility in connecting the pulsation line. It should be noted that connection 122 for the pulsation line may also be provided on the first sleeve part 110 if required, or that corresponding lockable openings for a pulsation line may be provided on both the first sleeve part 110 and the second sleeve part 120 to allow a high degree of flexibility in adaptation to given milking equipment.

In further embodiments, different second sleeve parts 120 are provided, in which different connection geometries are designed for the connection 122 without the need for lockable openings, so that a desired connection configuration can be set by selecting a suitable second sleeve part. Especially in combination with a modular connection 121 as a third sleeve part, this results in a high degree of flexibility when setting the entire connection configuration for the teat cup sleeve. This means that a suitable connection geometry for the pulsation line can be set by selecting the second sleeve part 120 with the suitable connection geometry for connection 122 in conjunction with a suitable connection configuration for connection 121, which is coupled to the second sleeve part 120.

For the connection to a pulsation line, an adjustment can be made for the otherwise same sleeve part by simply adapting the connection 122 to the given conditions for connection to a pulsation line by inserting a suitable additional part, for example in the form of a modular connection piece, as shown, for example, as connection 222 in FIG. 2a, 2b, and by using a suitable cover 124.

In the embodiment shown, an air inlet valve 150 is also provided which is fitted into an opening 126 which, in the embodiment shown, is formed in the second sleeve part 120 but, in other embodiments, may be provided instead in the first sleeve part 110. The air inlet valve 150 is used for periodic air inlet in order to achieve a more gentle and at the same time more efficient milking, e.g. by achieving more favorable vacuum conditions at the teat of the animal to be milked and also an improved discharge of the milked milk.

As explained above, other embodiments of the opening 126 are provided to allow continuous air inlet without the use of an air inlet valve if this is considered an appropriate option to improve the removal of milked milk. In other variants, there is no corresponding opening for a continuous or periodic air inlet if, for example, a milk collector is used in which a corresponding opening for a continuous air inlet already exists. The possibility of providing a corresponding opening on the first or second sleeve part, thus providing corresponding sleeve parts with different openings, again provides a high degree of flexibility in setting the final configuration of the teat cup sleeve. This means that in advantageous variants the conditions for an air inlet can be set, i.e. periodically or continuously, or even the absence of an air inlet, if necessary independently of other characteristics, such as the connection geometry for the milk discharge and/or the connection geometry of the pulsation line. For example, the modular connection 121 in the form of a third sleeve part can be used to set the desired connection geometry for the milk discharge without having to change the connection configuration for the pulsation line and/or the type of air inlet. The same applies to the connection geometry of the pulsation line, which, for example, can be set independently of the type of air inlet and the connection geometry for the milk discharge. In the same way, the type of air inlet, i.e. periodic, continuous or no air inlet, can be set without affecting the other two aspects of the teat cup sleeve.

The first sleeve part 110 and the second sleeve part 120 can be detachably attached to each other with a coupling device 140, so that in preferred embodiments it is possible to couple and decouple the first sleeve part 110 and the second sleeve part 120 without the use of tools. In the embodiment shown, the coupling device is in the form of corresponding thread areas formed on the first sleeve part 110 and in complementary form on the second sleeve part 120. The use of a coupling device as a screw connection is particularly advantageous for a reliable fastening mechanism that can be released without tools, so that the combination of the first sleeve part and the second sleeve part can be changed quickly. Preferably a sealing means, such as an O-ring and the like, is provided if the coupling device 140 cannot per se ensure sufficient tightness in conjunction with the shape and material of the first sleeve part 110 and the second sleeve part 120.

Furthermore, a ballast element 130 is provided which can be used, for example, if the total weight of the teat cup sleeve 100 is not sufficient to achieve the desired effect during milking. For example, with a view to more efficient stimulation during milking, it may be advantageous to provide for a certain minimum weight of the teat cup sleeve 100, which may well be individual of each animal, so that by providing different ballast elements 130 depending on the basic weight of the sleeve parts 110 and 120, a desired total weight can be set. In other cases, the first and/or the second sleeve part 110, 120 are already available with different own weights with otherwise the same component geometry, so that a desired total weight can also be achieved by combining corresponding sleeve parts. However, the possibility of an additional use of a ballast element is favorable, as the behavior of the teat cup sleeve 100 during milking can be changed quickly without having to make any significant changes to the basic structure and the existing connections. The ballast element 130 can be attached to the first sleeve part 110 and/or the second sleeve part 120 by any suitable means, e.g. a corresponding screw connection and the like can be provided. In other cases, the ballast element 130 is simply pushed over, for example, the first sleeve part 110 and fixed by means of a suitably arranged stop surface in conjunction with the elastic teat holder 190.

FIG. 1b shows the teat cup sleeve 100 in the form of an operational teat cup, i.e. the elastic teat holder 190 is installed in the teat cup sleeve 100 and the first sleeve part 110 and the second sleeve part 120 are coupled to each other. In this state, the required lines, such as the pulsation line, a milk hose and the like, can be connected to the teat cup sleeve 100 in the embodiment shown at the corresponding connections, which are formed on the second sleeve part 120.

FIG. 2a shows a perspective elevation view of a further embodiment of a teat cup sleeve with modular structure according to the present invention. A teat cup sleeve 200 forming a teat cup in conjunction with an elastic teat holder 290, comprising a first sleeve part 210 and a second sleeve part 220, the first sleeve part 210 being substantially cylindrical in shape with dimensions, i.e. diameter and length, suitable for teat holder 290 and in conjunction with the second sleeve part 220 allowing the teat holder 290 to be connected to a connection assembly 221 for discharging milk. As explained above, the first sleeve part 210 can be made of any material, such as plastic material, various types of metal, composite materials, etc., as is considered suitable for the milking situation in question. In an appropriate system, there are usually several different sleeve parts 210, 220 available, so that a suitable combination can be selected to best meet the existing requirements. A coupling device 230 is designed in such a way that the first sleeve part 210 and the second sleeve part 220 can be connected to each other even with otherwise different dimensions, for example with regard to the diameter outside the coupling device 230. For example, the coupling device 230 is designed as a screw connection. As explained above, suitable sealing means can be provided if the tightness achieved by the 230 coupling device is considered insufficient. For example, in an embodiment, an O-ring is provided at a suitable location in the first sleeve part 210 and/or the second sleeve part 220. The second part 220 in this embodiment has the necessary connections for milk discharge and connection to a pulsation line, as explained above in connection with the embodiment of FIG. 1. The connection to a milk line can also be established by coupling a suitable connection 221 for an otherwise unchanged sleeve part.

For the connection to a pulsation line, an adjustment can be made for the otherwise same sleeve part by simply adapting the connection 222 to the given conditions for connection to a pulsation line by using a suitable additional part, which is shown here in the form of a modular connection piece, and by using a suitable cover, as described above in connection with connection 122.

In the embodiment shown, the connection arrangement 221 for connection to the elastic teat holder 290 is designed in such a way that a connection 225 is oriented at an angle to the longitudinal direction of the cup sleeve 200, so that a lateral discharge of the milk milked is possible. Such an arrangement is advantageous if, for example, insufficient ground clearance is guaranteed for the teat cup sleeve 200 during the milking process, for example because the distance between the teat tip of the animal to be milked and the ground does not allow the milk to be led straight out and therefore does not allow a straight connection to a milk hose. For example, the second sleeve part 220 can easily be replaced, for example with a sleeve part as shown in FIG. 1, if different spatial conditions or a different milking situation prevail, but otherwise a teat cup with the same characteristics is required.

In the embodiment shown, an air inlet valve 250 is also provided, which enables a periodic air inlet, whereby in the embodiment shown, the air inlet valve 250 is in turn provided on the second sleeve part 220. Furthermore, a maintenance opening 228 is provided in the second sleeve part 220 which is dimensioned and positioned so as to allow access to a milk discharge area, for example an area in which the milk discharge changes from the flow direction running to the longitudinal direction of the teat cup sleeve 200 to the direction of the angled connection 225 perpendicular thereto. This area can be a critical area, as it is preferred to encounter foreign bodies that are sucked in during the milking process, for example when the cup is dropped. The maintenance opening 228, as shown in the embodiment, is designed in such a way that it can be opened and closed without the use of tools. For example, a plug 229 is provided, which on the one hand guarantees a reliable sealing of the maintenance opening 228, but on the other hand allows easy access, so that inspection and/or maintenance of the teat cup sleeve 200 can be carried out quickly, especially during the milking process.

In the embodiment shown, a protective element 227 is also provided, such as a protective cap, which protects sensitive areas, in particular the connection arrangements 221, the second sleeve part 220 and parts of the air inlet valve 250, but on the other hand allows access to the maintenance opening 228 as well as to the connection 225. The protective element 227 is made of any suitable material which has the necessary flexibility to be attached to the second sleeve part 220 and which provides the desired protective effect.

FIG. 2b shows the teat cup sleeve 200 in the form of a teat cup, i.e. the elastic teat holder 290 is integrated in the sleeve 200 and the two sleeve parts 210 and 220 are coupled together.

The same criteria apply to the teat cup sleeve 200 with regard to the aspects of the air inlet, the connection geometry for the pulsation line and for the milk discharge, as have already been explained in connection with the teat cup sleeve 100.

As explained earlier, the present invention provides a modular teat cup system in which a plurality of first teat cup parts, such as the teat cup parts 110, 210, which may differ in some characteristics, and a plurality of second teat cup parts 120, 220, which may also differ in their characteristics, are available. This means that a plurality of first sleeve parts 110 can be provided, which differ in material type, and thus in weight, general geometry, length, diameter, etc., but are designed in such a way that they can be combined with all second sleeve parts 120, 220, for instance due to the coupling device 130, 230. Also the second sleeve parts 120, 220 can be available in many different variants, so that an adaptation to different connection configurations and the like is easily possible. By selecting the appropriate sleeve parts, a user can thus put together a teat cup that is best suited to a particular milking situation. This can also be done at short notice before or during milking or during a preparatory phase, when changes to the milking system, changes to the construction, changes to the milking strategy in general, etc. require adapted geometry and/or weight of the teat cup.

In particular, the modular design of the connection configuration for the milk discharge, i.e. connection 121, 221, allows extremely flexible conditions to be created to allow adaptation to different conditions. This means that in advantageous variants the conditions for the air inlet of the teat cup sleeve can be set independently of the aspect of the connection configuration for the pulsation line and/or the milk discharge. Similarly, the connection configuration for the pulsation line can be set independently of the connection configuration for the milk line and/or the type of air inlet. Similarly, if necessary, the milk discharge connection configuration can be selected independently of the type of air inlet and/or pulsation line connection configuration. In this way, when the specific conditions and space of the installation are known and the specific conditions of the animals are known, it is possible to provide a teat cup that is optimally assembled for the application in question, using appropriate individual module components without having to provide a complete teat cup for each purpose. In particular, an iterative adjustment can be made by simply replacing one component of the modular teat cup system until the desired result is achieved.

In other situations, even at very short notice, the milking behavior of the modular teat cup sleeve can be changed by adjusting the weight to the desired requirements by replacing sleeve parts, preferably the first sleeve part, possibly in conjunction with the provision of a ballast element.

What is claimed is:

1. Modular teat cup system, comprising:
   first sleeve parts adapted to insert an elastic teat holder, and
   a second sleeve part which can be coupled to a respective one of the first sleeve parts in order to achieve operational readiness and can be uncoupled from the respective one of the first sleeve parts, the respective one of the first sleeve parts and the second sleeve part forming a teat cup sleeve when coupled,
   at least the first sleeve parts being provided with different lengths;
   a first connection arrangement of modular design configured to be detachably coupled to said second sleeve part, said first connection arrangement configured to discharge milk along a longitudinal direction of said second sleeve part; and
   a second connection arrangement of modular design configured to be detachably coupled to said second sleeve part and oriented under an angle to the longitudinal direction of said second sleeve part so as to enable lateral discharge of milk.

2. Modular teat cup system according to claim 1, wherein the second sleeve part has a connection for an opening for an outlet end of the elastic teat holder.

3. Modular teat cup system according to claim 1, wherein one of the first and second sleeve parts have a removable connection for a pulsation line.

4. Modular teat cup system according to claim 1, wherein a coupling device is provided for mechanically coupling and decoupling a respective first and second sleeve parts independently of dimensions of the first and second sleeve parts.

5. Modular teat cup system according to claim 4, wherein the coupling device is designed for tool-free coupling and decoupling.

6. Modular teat cup system according to claim 1, wherein a sealing is provided at a contact region between a respective one of the first sleeve parts and the second sleeve part.

7. Modular teat cup system according to claim 1, further comprising a protective ring attached or attachable to at least one of the first sleeve parts.

8. Modular teat cup system according to claim 1, further comprising a plurality of ballast weights which are attachable to one of the first and second sleeve parts for adjusting the weight of the teat cup sleeve.

9. Modular teat cup system according to claim 1, wherein an opening for an air inlet is provided on one of the first and the second sleeve parts.

10. Modular teat cup system according to claim 1, wherein a lockable maintenance opening is formed in the second sleeve part.

11. Modular teat cup system according to claim 1, wherein at least the first sleeve parts are provided with different dimensions for adaptation to one of different elastic teat holders and different milking conditions.

12. Modular teat cup system according to claim 1, further comprising different connection arrangements of modular design for connection to a pulsation system.

13. Modular teat cup system according to claim 1, wherein at least one of the first sleeve parts and the second sleeve part are available in different materials.

14. A method for adapting a modular teat cup sleeve for milking different animals, comprising the steps of:
  selecting one of a plurality of first sleeve parts suitable for receiving a desired elastic teat holder, wherein each one of the first sleeve parts has a different weight, length, and diameter for milking a particular one of the different animals,
  selecting one of a plurality of second sleeve parts so as to be suitable for connection to a milking system, and
  coupling the selected one of the plurality of first sleeve parts and the selected one of the plurality of second sleeve parts together,
  whereby the modular teat cup sleeve is capable of being adapted to the particular one of the different animals or a particular milking situation.

15. A modular teat cup system for milking different animals comprising:
  a plurality of first sleeve parts, each one of said plurality of first sleeve parts having a different characteristic suited to a particular milking situation and a first open end configured to receive an elastic teat holder and an opposing open end having a first coupling; and
  two second sleeve parts, each having a second coupling configured to attach to said first coupling of each of said plurality of first sleeve parts and an end configured to receive a connection for a milk discharge;
  wherein one of said two second sleeve parts has the milk discharge longitudinally and another one of said two second sleeve parts has the milk discharge laterally,
  whereby one of said plurality of first sleeve parts and one of said two second sleeve parts is capable of being selected for the particular milking situation or a particular one of the different animals.

* * * * *